United States Patent
Komura et al.

(10) Patent No.: US 6,608,415 B2
(45) Date of Patent: Aug. 19, 2003

(54) SPINDLE MOTOR

(75) Inventors: Osamu Komura, Itami (JP); Hisao Takeuchi, Itami (JP); Makoto Otsuki, Itami (JP); Kaoru Murabe, Itami (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 0 days.

(21) Appl. No.: 10/164,631

(22) Filed: Jun. 10, 2002

(65) Prior Publication Data

US 2002/0180289 A1 Dec. 5, 2002

Related U.S. Application Data

(62) Division of application No. 09/786,861, filed on Mar. 12, 2001, now Pat. No. 6,417,590.

(30) Foreign Application Priority Data

Jul. 14, 1999 (JP) ............................................ 11-199969
Jul. 10, 2000 (JP) ................................. PCT/JP00/04626

(51) Int. Cl.[7] ................................................. H02K 7/08
(52) U.S. Cl. ......................................... 310/90; 384/107
(58) Field of Search ...................... 310/90, 90.5, 67 R; 384/107, 100, 112; 360/99.08, 99.07

(56) References Cited

U.S. PATENT DOCUMENTS

| | | | |
|---|---|---|---|
| 4,998,033 A | 3/1991 | Hisabe et al. | 310/67 R |
| 5,089,732 A * | 2/1992 | Konno et al. | 310/67 R |
| 5,223,758 A | 6/1993 | Kataoka et al. | 310/67 R |
| 5,280,208 A | 1/1994 | Komura et al. | 310/90 |
| 5,322,369 A | 6/1994 | Kataoka et al. | 384/1 |
| 5,574,322 A | 11/1996 | Nii et al. | 310/156.04 |
| 5,903,078 A | 5/1999 | Sakamot et al. | 370/261 |
| 6,417,590 B1 * | 7/2002 | Komura et al. | 310/90.5 |

FOREIGN PATENT DOCUMENTS

| | | |
|---|---|---|
| JP | 62-48147 | 3/1987 |
| JP | 2-110980 | 9/1990 |
| JP | 5-141420 | 6/1993 |
| JP | 11-69715 | 3/1999 |
| JP | 2000-139066 | 5/2000 |

* cited by examiner

*Primary Examiner*—Dang Dinh Le
(74) *Attorney, Agent, or Firm*—McDermott, Will & Emery

(57) ABSTRACT

There is provided a means for preventing wear caused by the contacting/sliding of a thrust hydrodynamic gas bearing surface when a spindle motor is started. A cylinder 4 of a radial hydrodynamic gas bearing that has radial hydrodynamic grooves in an outer circumferential surface thereof and a disk 3 of a thrust hydrodynamic gas bearing that has thrust hydrodynamic grooves in an upper face thereof are disposed on an upper end of an axial center of a stator core 2 having a stator 2a around which a motor coil 7 is wound, a hollow cylinder 6 whose inner surface facing the cylinder 4 of the radial hydrodynamic gas bearing is smooth and a rotor magnet 8 facing the motor coil 7 are disposed on a hub 5 acting as a rotational member, a load in a radial direction is supported by the radial hydrodynamic gas bearing, and a load in a thrust direction is supported by using the thrust hydrodynamic gas bearing together with a magnetic bearing consisting of the stator 2a and the rotor magnet 8.

10 Claims, 8 Drawing Sheets

(a)

(b)

(a)

(b)

(a)

(b)

(a)

(b)

PRIOR ART

SPINDLE MOTOR

This application is a Divisional of Ser. No. 09/786,861 filed Mar. 12, 2001 now U.S. Pat. No. 6,417,590.

TECHNICAL FIELD

The present invention relates to, in a rotating device in which a spindle motor provided with a hydrodynamic gas bearing that has a radial hydrodynamic gas bearing and a thrust hydrodynamic gas bearing acts as a driving source for a rotator, such as a magnetic disk, an optical disk, or a polygon mirror, a structure for preventing the wear of a thrust hydrodynamic gas bearing surface caused by contacting/sliding especially when it starts.

BACKGROUND ART

In a rotating device for a rotator, such as a magnetic disk, an optical disk, or a polygon mirror, it is widely known that a spindle motor provided with a hydrodynamic gas bearing is employed as a driving source for the rotator. The reason is that the motor is characterized in, for example, that the hydrodynamic gas bearing is simple in structure and can be made more compact, that its noncontact rotation during steady-state rotation does not generate vibrations or rotational irregularity that is caused by the bearing, that it is superior in high-speed durability, and that there is no contamination caused by the dispersion of a lubricant because oil, grease, or the like, is not used.

However, the disadvantage of the spindle motor provided with the hydrodynamic gas bearing is that the hydrodynamic surface of the thrust bearing is in contact when stopped, which causes wear of the surface thereof due to contacting/sliding at the onset of operation. In order to overcome this disadvantage, there is a means in which the hydrodynamic surface of the thrust bearing is floated when stopped, a thrust load is then received by an axial center part of a cylinder of the radial hydrodynamic gas bearing that is a fixed member, and the axial center part of the cylinder is spaced by the thrust of radial hydrodynamic grooves generated with the increase of the revolution speed of the spindle motor so as to maintain the gap of the thrust bearing to have a set value.

Its embodiment is proposed in Japanese Unexamined Patent Publication No. 69715 of 1999. FIG. 10 shows the structure of a shaft fixing type spindle motor 100 therein. 101 is a base plate of a stator 110, 102 is a cylindrical member used also as a shaft erected on the base plate 101, and 103 is a hollow cylindrical member that has a closed end. The hollow cylindrical member 103, the closed end of which is placed upward, is rotatably fitted onto the cylindrical member 102. A donut-shaped thrust member 104 is integrally formed on the outer periphery of the hollow cylindrical member 103, and, at a position opposite to this, a thrust pressure member 106 is disposed through a cover 105 that engages with the base plate 101. A rotor 108 acting as a rotator is fixed to a hub 107 formed integrally with the hollow cylindrical member 103. A rotor magnet 109 is disposed on the outer circumferential surface of the lower part of the hollow cylindrical member 103, and, at a position opposite to this, a motor coil 111 wound around the stator 110 that extends from the base plate 101 is disposed.

When the spindle motor 100 is stopped, the closed end of the hollow cylindrical member 103 and the top of the cylindrical member 102 come into contact with each other by the weight of the rotor 108 including the hub 107, and a gap between the thrust member 104 and the thrust pressure member 106 is sufficiently secured. When an electric current is passed through the motor coil 111, the hollow cylindrical member 103 rotates clockwise, viewed from the side of the rotor 108. And, as its revolution speed increases, a thrust occurs at a herringbone groove 112 formed largely in the upper part of the outer circumferential surface of the cylindrical member 102, whereby the closed end of the hollow cylindrical member 103 and the top of the cylindrical member 102 draw away from each other. Simultaneously, by thrust hydrodynamic that is generated by a spiral groove (not shown) formed in the upper face of the thrust member 104, a gap to the thrust pressure member 106 is reduced and the rotor 108 floats to a position where the thrust and the thrust hydrodynamic preserve a balance.

The publication states that, by the construction as described above, the thrust member 104 and the thrust pressure member 106 are prevented from contact and sliding during the steady-state rotation, and rises no wear whatsoever occurs in this part. Additionally, it says that the rotor 108 up by the thrust generated in the herringbone groove 112 of the radial hydrodynamic gas bearing, and therefore it is possible to obtain a compact spindle motor in which extra additional means other than the hydrodynamic gas bearing are omitted.

However, in the structure of the spindle motor of FIG. 10, since the thrust member 104 disposed on the outer periphery of the hollow cylindrical member 103 must undergo processing to form a spiral groove, the shape becomes complex, and an integral construction is uneconomical. Additionally, since the thrust pressure member 106 is situated above the thrust member 104 which floats upward, the base plate 101 and the cover 105 are required to undergo processing for centering, thus making the shape complex and the assembly difficult. Furthermore, because of the accumulative errors of these interrelated members, it is extremely difficult to maintain the gap of the thrust hydrodynamic gas bearing to be several-microns in order. Therefore, in order to solve the aforementioned problem, the present invention provides a spindle motor capable of preventing contact between a fixed member and a rotating member also when stopped.

DISCLOSURE OF THE INVENTION

In a first embodiment, a cylinder of a radial hydrodynamic gas bearing that has radial hydrodynamic grooves in an outer circumferential surface thereof and a disk of a thrust hydrodynamic gas bearing that has thrust hydrodynamic grooves in an upper face thereof are disposed on an upper end on an axial center of a stator core having a stator around which a motor coil is wound; a hollow cylinder whose inner surface facing the cylinder of the radial hydrodynamic gas bearing is smooth and a rotor magnet facing the motor coil are disposed on a hub acting as a rotational member; a load in a radial direction is supported by the radial hydrodynamic gas bearing; and a load in a thrust direction is supported by using the thrust hydrodynamic gas bearing together with a magnetic bearing consisting of the stator and the rotor magnet.

In a second embodiment, a hub acting as a rotational member is disposed on an upper end of a motor shaft provided with a rotor magnet on an outer periphery thereof; below the motor shaft, there are disposed a disk of a thrust hydrodynamic gas bearing that has thrust hydrodynamic grooves in a lower face thereof and a cylinder of a radial hydrodynamic gas bearing that has radial hydrodynamic grooves in an outer circumferential surface thereof; as a fixed member, there are disposed a hollow cylinder whose inner surface facing the cylinder of the radial hydrodynamic gas bearing is smooth and a stator around which a motor coil is wound, the stator facing the rotor magnet; a load in a radial direction is supported by the radial hydrodynamic gas bearing; and a load in a thrust direction is supported by using the thrust hydrodynamic gas bearing together with a magnetic bearing consisting of the stator and the rotor magnet.

In a third embodiment, a cylinder of a radial hydrodynamic gas bearing that has radial hydrodynamic grooves in an outer circumferential surface thereof and a disk of a thrust hydrodynamic gas bearing that has thrust hydrodynamic grooves in an upper face thereof are disposed on an upper end on an axial center of a stator core having a stator around which a motor coil is wound; a hollow cylinder whose inner surface facing the cylinder of the radial hydrodynamic gas bearing is smooth and a rotor magnet facing the motor coil are disposed on a hub acting as a rotational member; a secondary magnetic bearing is disposed that comprises a first permanent magnet shaped like a ring, the first permanent magnet fixed to an upper end surface of the cylinder, and a second permanent magnet shaped like a ring, the second permanent magnet fixed to an upper end surface of the hollow cylinder in such a way as to surround the first permanent magnet; a load in a radial direction is supported by the radial hydrodynamic gas bearing; and a load in a thrust direction is supported by using together the thrust hydrodynamic gas bearing, the secondary magnetic bearing, and a primary magnetic bearing consisting of the stator and the rotor magnet.

In a fourth embodiment, a hub acting as a rotational member is disposed on an upper end of a motor shaft provided with a rotor magnet on an outer periphery thereof; below the motor shaft, there are disposed a disk of a thrust hydrodynamic gas bearing that has thrust hydrodynamic grooves in a lower face thereof and a cylinder of a radial hydrodynamic gas bearing that has radial hydrodynamic grooves in an outer circumferential surface thereof; in a case as a fixed member, there are disposed a hollow cylinder whose inner surface facing the cylinder of the radial hydrodynamic gas bearing is smooth and a stator around which a motor coil is wound, the stator facing the rotor magnet; a secondary magnetic bearing that comprises a first permanent magnet shaped like a ring is disposed, the first permanent magnet fixed to a lower end surface of the cylinder, and a second permanent magnet shaped like a ring, the second permanent magnet fixed to a lower end surface of the hollow cylinder in such a way as to surround the first permanent magnet; a load in a radial direction is supported by the radial hydrodynamic gas bearing; and a load in a thrust direction is supported by using together the thrust hydrodynamic gas bearing, the secondary magnetic bearing, and a primary magnetic bearing consisting of the stator and the rotor magnet.

Preferably, the radial hydrodynamic grooves which exist in each embodiment consist of at least three groove lines, each lead terminal of which is formed in a range so as not to extend beyond the starting point of an adjacent groove line in a development.

Additionally, even if the radial hydrodynamic groove that exists in each embodiment is a herringbone groove having a groove length asymmetrical to the upper and lower parts, a similar effect is obtained.

And, it is preferable to use light, hard silicon nitride ceramics, silicon carbide ceramics, or alumina ceramics for members making up a radial hydrodynamic gas bearing and a thrust hydrodynamic gas bearing.

EMBODIMENT 1

Figure 1:
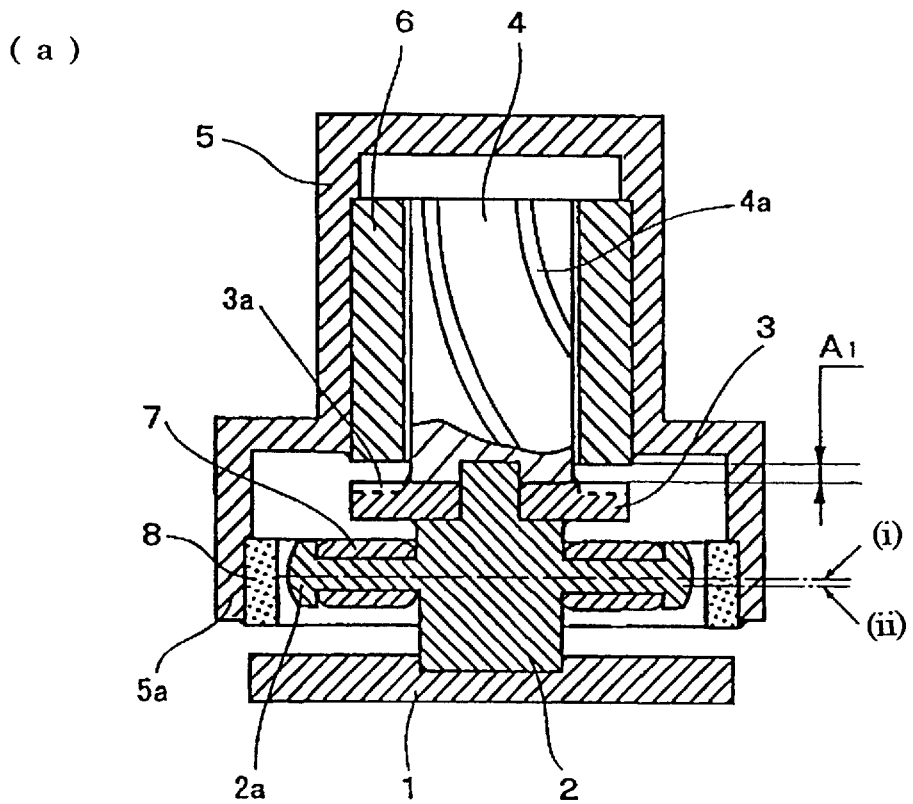
FIGS. 1a and 1b are sectional views of the first embodiment of the spindle motor of the present invention.
Figure 1:
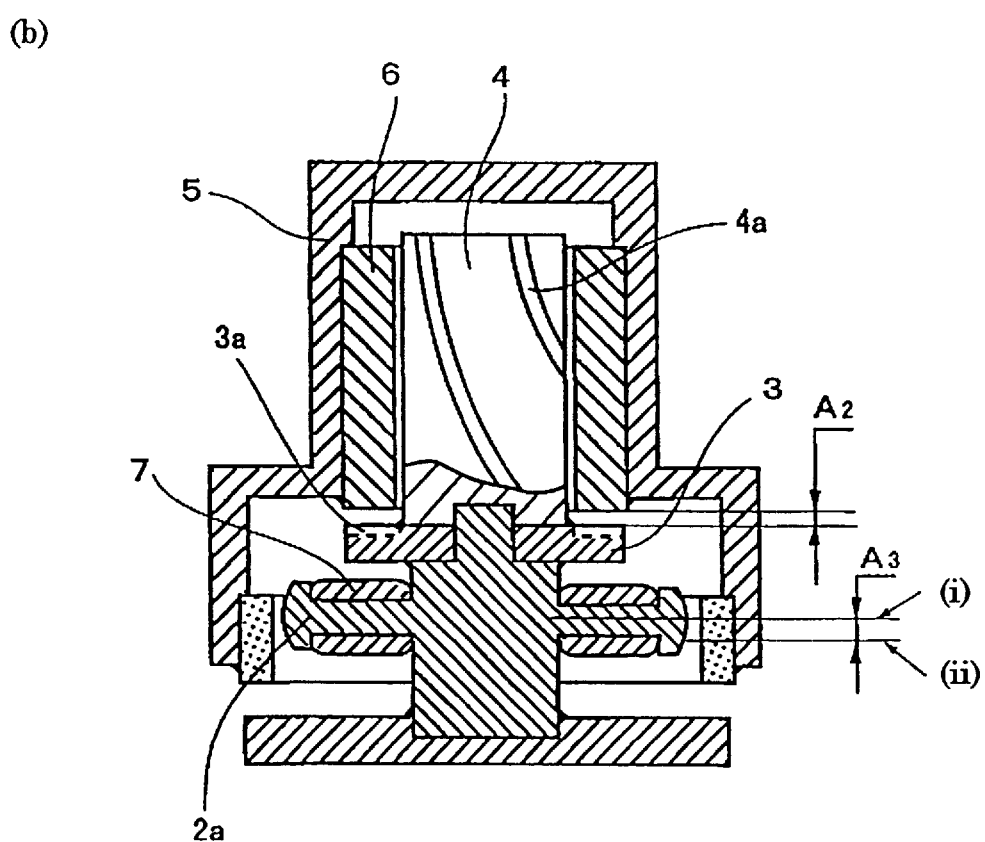

Preferred embodiments in which the present invention is embodied will be described in detail hereinafter with reference to the attached drawings. FIG. 1 shows the structure of a first embodiment in which a magnetic bearing is constructed between a stator and a rotor magnet, wherein (a) is a diagram of a state when stopped, and (b) is a diagram of steady-state rotation.

In FIG. 1(a), reference character 1 designates a base plate for fixing a stator core 2 as a fixed member. A stator 2a that is made of a silicon steel plate is disposed integrally with the outer periphery of the stator core 2, and is encircled with a motor coil 7. On the axial center of the stator core 2, there are fixed a disk 3 of a thrust hydrodynamic gas bearing that has a spiral groove 3a acting as thrust hydrodynamic grooves and so forth in its upper face and a cylinder 4 of a radial hydrodynamic gas bearing that has spiral grooves 4a acting as radial hydrodynamic grooves in its outer circumferential surface. And, a hollow cylinder 6 an inner surface of which is smooth is fixed at a position where it faces the cylinder 4 inside a hub 5 acting as a rotational member. Furthermore, a rotor magnet 8 is disposed in the shape of a ring at a position where it faces a motor coil of a skirt 5a of the hub 5. It is noted that a gap between the cylinder 4 and the hollow cylinder 6 is set to have a difference of 5 $\mu$m or less in diameter. Rotators (not shown), such as a magnetic disk, an optical disk, and a polygon mirror, are mounted on the outer periphery of the hub 5.

The rotor magnet 8 and the stator 2a constitute a magnetic bearing. When the spindle motor is stopped, the center location (ii) of the rotor magnet 8 should rest at the center location (i) of the stator 2a that has the strongest magnetic force, but, according to a balance between the weight of the hub 5 and the magnetic force, it rests at a position slightly descending from the center location (i), because no electric current is passed through the motor coil 7. A clearance between the upper surface of the disk 3 that constitutes the thrust hydrodynamic gas bearing at this time and the bottom surface of the hollow cylinder 6 becomes A1, and they are in the state of non-contact.

As shown in FIG. 1(b), when an electric current is passed through the motor coil 7 and thereby an alternating field is generated in the stator 2a, the hollow cylinder 6 rotates counterclockwise, viewed from the side of the hub 5. As the revolution speed increases, the hub 5 descends because of the hydrodynamic of the hollow cylinder 6 that constitutes the radial hydrodynamic gas bearing and the spiral grooves 4a in the outer circumferential surface of the cylinder 4, so that a clearance between the upper surface of the disk 3 and the bottom surface of the hollow cylinder 6 becomes A2 as a result of the balance with repulsion that occurs in the spiral grooves 3a. Normally, the revolution speed of the hub 5 reaches 12000 to 18000 rpm, and A2 is maintained at the clearance of 2 to 3 μm. During steady-state rotation, since the hub 5 descends because of the hydrodynamic of the spiral grooves 4a, the center location (ii) of the rotor magnet 8 becomes lower than when stopped, and is deviated from (i) by A3, thus slightly decreasing the motor efficiency.

Figure 2:
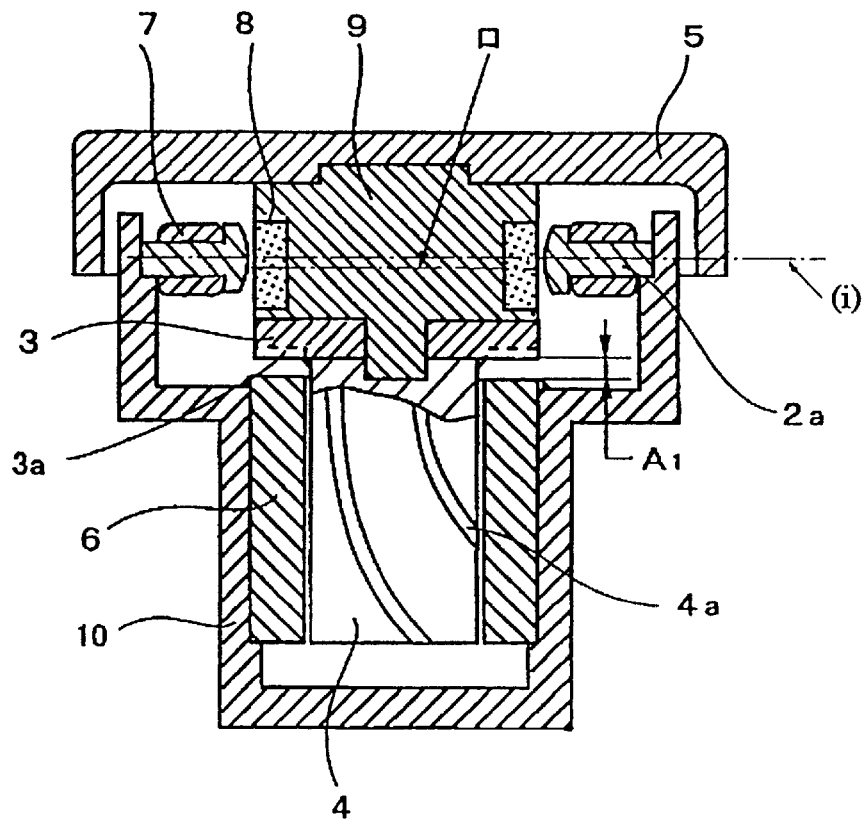
FIGS. 2a and 2b are sectional views of the second embodiment of the spindle motor of the present invention.
Figure 2:
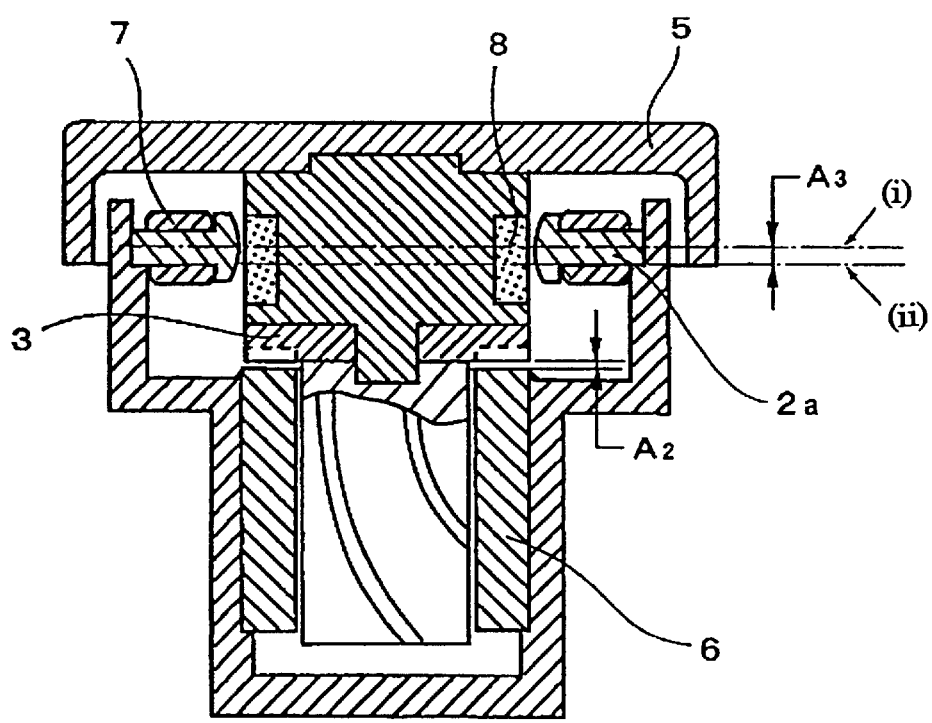

FIG. 2 shows the structure of a second embodiment in which a magnetic bearing is constructed between the stator 2a and the rotor magnet 8 in the same manner as in the first embodiment, with the side of the hollow cylinder 6 functioning as a fixed member. FIG. 2(a) is a diagram of a state when stopped, and FIG. 2(b) is a diagram of steady-state rotation.

In FIG. 2(a), reference character 9 designates a motor shaft, on the outer periphery of which the rotor magnet 8 is disposed, and a hub 5 acting as a rotational member is fixed to the upper end. Below the motor shaft 9, there are fixed a disk 3 of a thrust hydrodynamic gas bearing that has spiral grooves 3a, etc., acting as thrust hydrodynamic grooves in its undersurface and a cylinder 4 of a radial hydrodynamic gas bearing that has spiral grooves 4a acting as radial hydrodynamic grooves in its outer circumferential surface. A hollow cylinder 6 an inner surface of which is smooth is fixed to a case 10 as a fixed member at a position facing the cylinder 4, and a stator 2a that is made of a silicon steel plate and is encircled with a motor coil 7 is disposed integrally therewith at a position facing the rotor magnet 8.

When stopped, the undersurface of the disk 3 that constitutes the thrust hydrodynamic gas bearing and the upper end surface of the hollow cylinder 6 are mutually in a state of non-contact, and its clearance is A1. When an electric current is passed through the motor coil 7 and thereby an alternating field is generated in the stator 2a, the cylinder 4 rotates counterclockwise, viewed from the side of the hub 5, as shown in FIG. 2(b), and the hub 5 descends. A clearance between the undersurface of the disk 3 and the upper end surface of the hollow cylinder 6 becomes A2 as a result of the balance with repulsion generated by the spiral grooves 3a. Accordingly, the same operational effect as in the first embodiment is obtained. The center location (ii) of the rotor magnet 8 moves downward during steady-state rotation, and deviates from the center location (i) of the motor coil 7 by A3, thus decreasing the motor efficiency slightly, in the same manner as in the first embodiment.

Figure 3:
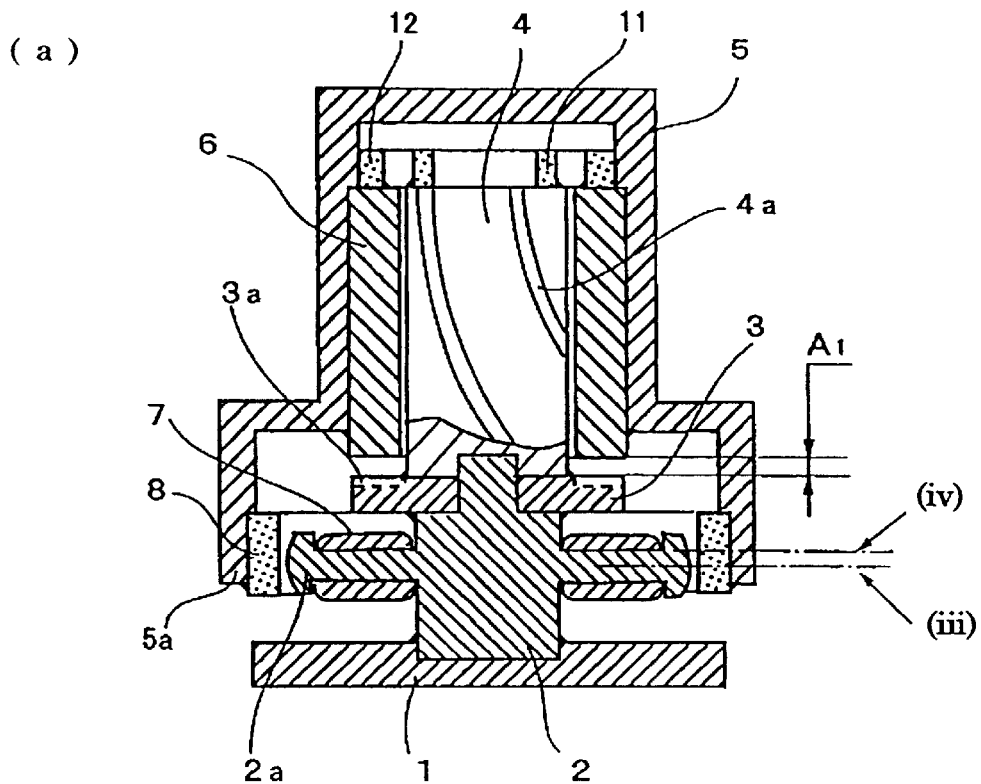
FIGS. 3a and 3b are sectional views of the third embodiment of the spindle motor of the present invention.
Figure 3:
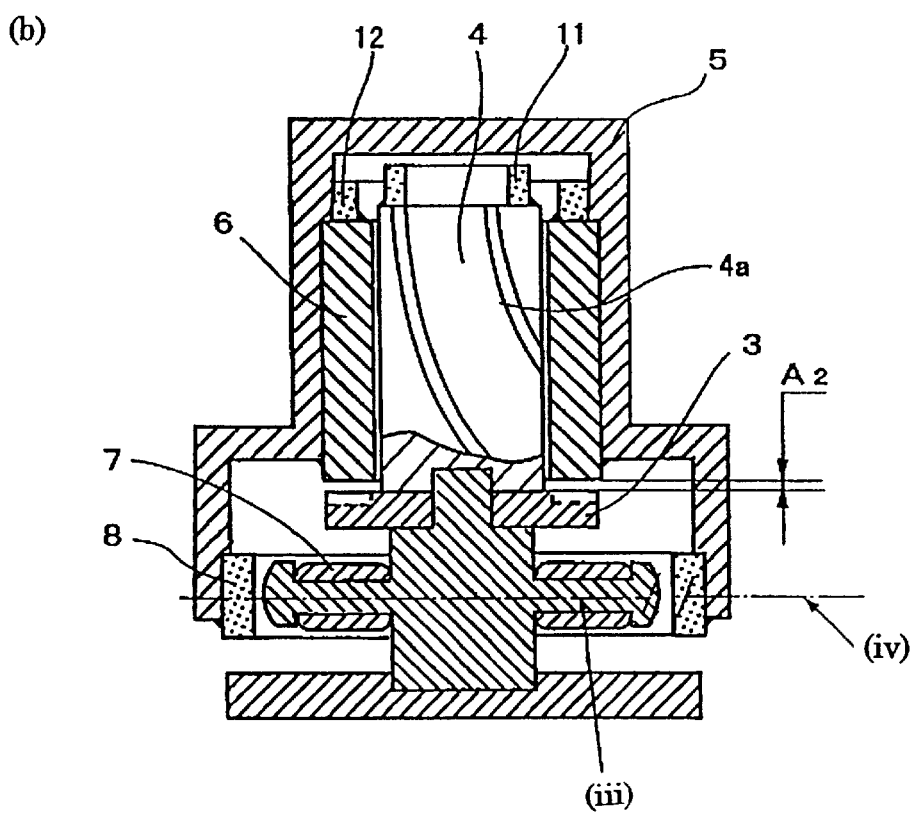

FIG. 3 shows the structure of a third embodiment in which a ring-shaped permanent magnet is fixed onto the concentric circle of the respective upper end surfaces of the cylinder 4 and the hollow cylinder 6 so as to construct a secondary magnetic bearing. FIG. 3(a) is a diagram of a state when stopped, and FIG. 3(b) is a diagram of steady-state rotation.

In FIG. 3(a), reference character 1 designates a base plate for fixing a stator core 2 as a fixed member. A stator 2a that is made of a silicon steel plate is disposed integrally with the outer periphery of the stator core 2, and is encircled with a motor coil 7. On the axial center of the stator core 2, there are fixed a disk 3 of a thrust hydrodynamic gas bearing that has a spiral groove 3a acting as thrust hydrodynamic grooves and so forth in its upper face and a cylinder 4 of a radial hydrodynamic gas bearing that has spiral grooves 4a acting as radial hydrodynamic grooves in its outer circumferential surface. And, a hollow cylinder 6 an inner surface of which is smooth is fixed at a position where it faces the cylinder 4 inside a hub 5 acting as a rotational member. Furthermore, a rotor magnet 8 is disposed in the shape of a ring at a position where it faces a motor coil of a skirt 5a of the hub 5, thereby constructing a primary magnetic bearing, in exactly the same manner as in the first embodiment.

In the first embodiment, the center location (iv) of the rotor magnet 8 sinks below the center location (iii) of the stator 2a because of the own weight of the hub 5 when stopped, but, in the third embodiment, in order to prevent this, a first permanent magnet 11 shaped like a ring is fixed to the upper end surface of the cylinder 4, and a second permanent magnet 12 shaped like a ring is fixed to the upper end surface of the hollow cylinder 6 in a manner so as to surround the first permanent magnet 11, thereby constructing a secondary magnetic bearing. If the outside of the first permanent magnet 11 is designed as a south pole and, on the other hand, the inside of the second permanent magnet 12 is designed as a north pole, or vice versa, the respective permanent magnets 11 and 12 attract each other so as to support the weight of the hub 5, and the center location (iv) of the rotor magnet 8 rests at a position higher than the center location (iii) of the stator 2a. The outer diameter of the first permanent magnet 11 is set at a slightly smaller value than the outer diameter of the cylinder 4, and the inner diameter of the second permanent magnet 12 is set at a slightly larger value than the inner diameter of the hollow cylinder 6, and they are fixed, for example, by an anaerobic adhesive that is hardened by ultraviolet rays. Accordingly, by enlarging a face-to-face gap between the permanent magnets 11 and 12 to be more than a face-to-face gap of the radial hydrodynamic gas bearing, the cylinder 4 and the hollow cylinder 6 are brought into contact together before the contact between the permanent magnets 11 and 12, thus facilitating the heating processing of the adhesive also.

The clearance between the upper surface of the disk 3 and the bottom surface of the hollow cylinder 6 when stopped in FIG. 3(a) becomes A1, and they are mutually maintained in the state of non-contact. When an electric current is passed through the motor coil 7, and the hollow cylinder 6 reaches the state of steady-state rotation in which the hollow cylinder 6 rotates counterclockwise viewed from the side of the hub 5, the hub 5 descends to the position of A2 because of the hydrodynamic in the spiral grooves 4a in the outer circumferential surface of the cylinder 4 and the hollow cylinder 6 that constitute a radial hydrodynamic gas bearing. In this state, since the center (iv) of the rotor magnet 8 coincides with the center (iii) of the motor coil 7 in the optimum zone of magnetic lines of force, the efficiency of the motor can be optimized.

Figure 4:
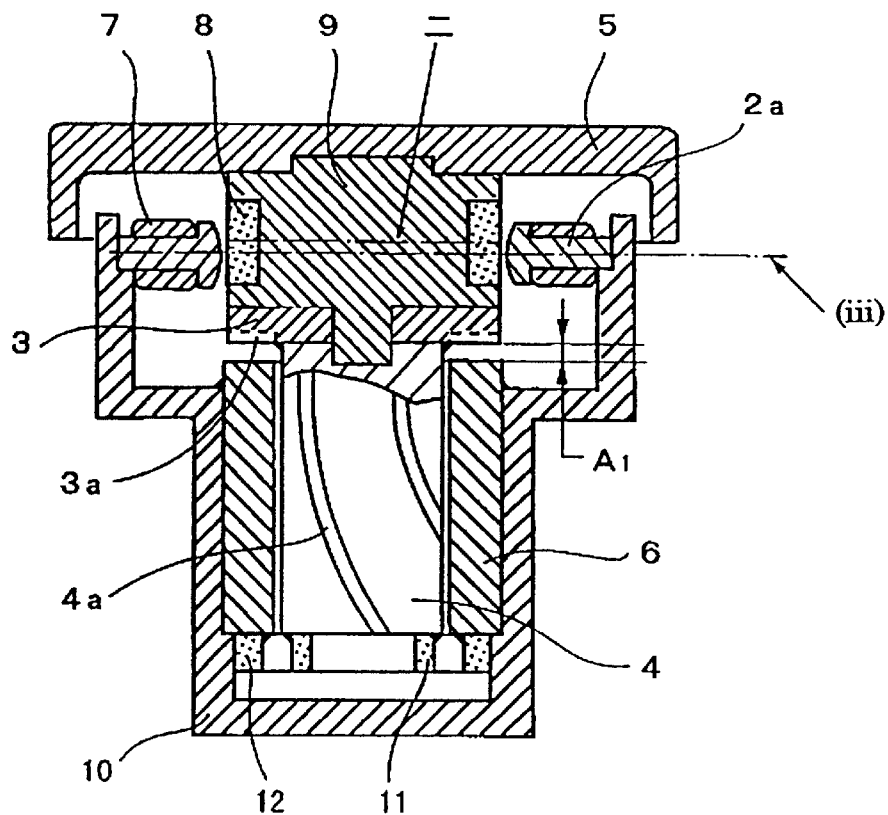
FIGS. 4a and 4b are sectional views of the fourth embodiment of the spindle motor of the present invention.
Figure 4:
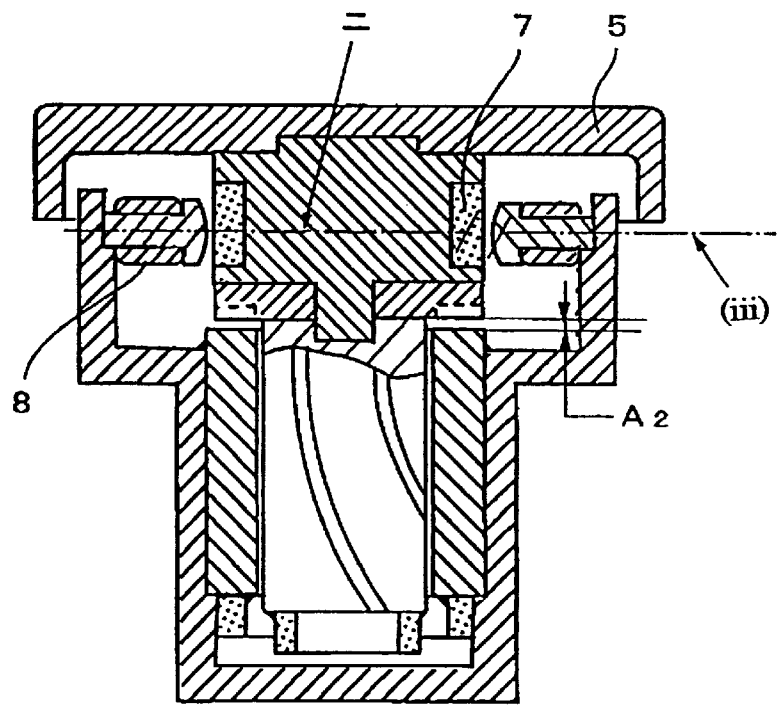

FIG. 4 shows the structure of a fourth embodiment in which a secondary magnetic bearing is constructed in the same manner as in the third embodiment, with the side of the hollow cylinder 6 functioning as a fixed member. FIG. 4(a) is a diagram of a state when stopped, and FIG. 4(b) is a diagram of steady-state rotation.

In FIG. 4(a), reference character 9 designates a motor shaft, on the outer periphery of which the rotor magnet 8 is disposed, and a hub 5 acting as a rotational member is fixed to the upper end. Below the motor shaft 9, there are fixed a disk 3 of a thrust hydrodynamic gas bearing that has spiral grooves 3a, etc., acting as thrust hydrodynamic grooves in its undersurface and a cylinder 4 of a radial hydrodynamic gas bearing that has a spiral groove 4a acting as radial hydrodynamic grooves in its outer circumferential surface. A hollow cylinder 6 an inner surface of which is smooth is fixed to a case 10 as a fixed member at a position facing the cylinder 4, and a stator 2a that is made of a silicon steel plate and is encircled with a motor coil 7 is disposed integrally therewith at a position facing the rotor magnet 8, thereby constructing a primary magnetic bearing, in exactly the same manner as in the second embodiment.

Further, a first permanent magnet 11 shaped like a ring is fixed to the bottom surface of the cylinder 4, and a second permanent magnet 12 shaped like a ring is fixed to the bottom surface of the hollow cylinder 6 in such a way as to surround the first permanent magnet 11 so as to construct a secondary magnetic bearing, in exactly the same manner as in the third embodiment.

The clearance between the disk 3 and the hollow cylinder 6, which are in a non-contact state, when stopped in FIG. 4(a) becomes A1, and when an electric current is passed through the motor coil 7, and the hollow cylinder 6 reaches the state of steady-state rotation in which the hollow cylinder 6 rotates counterclockwise viewed from the side of the hub 5, the hub 5 descends to the position of A2 as shown in FIG. 4(b). In this state, since the center (iv) of the rotor magnet 8 coincides with the center (iii) of the motor coil 7 in the optimum zone of magnetic lines of force, the efficiency of the motor can be optimized as in the third embodiment.

Figure 5:
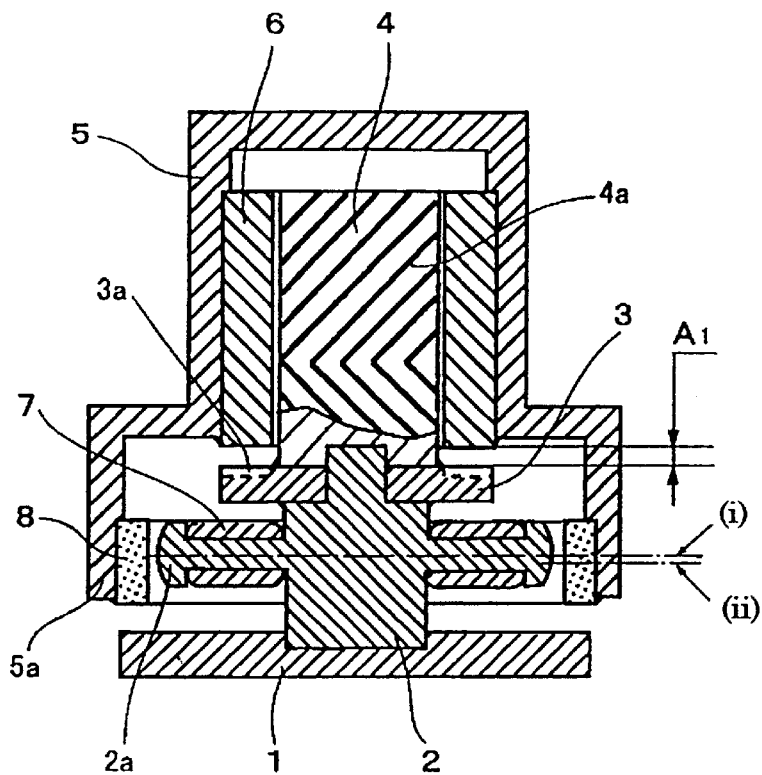
FIG. 5 shows an example in which a herringbone groove is formed as thrust hydrodynamic grooves in the first embodiment of the present invention.
Figure 6:
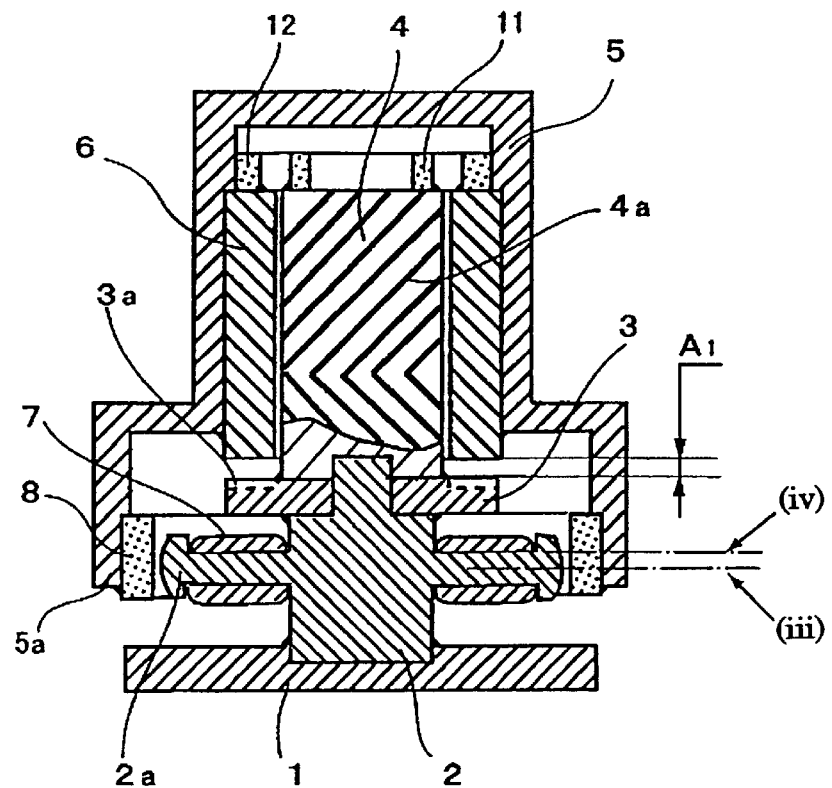
FIG. 6 shows an example in which herringbone grooves are formed as thrust hydrodynamic grooves in the third embodiment of the present invention.
Figure 7:
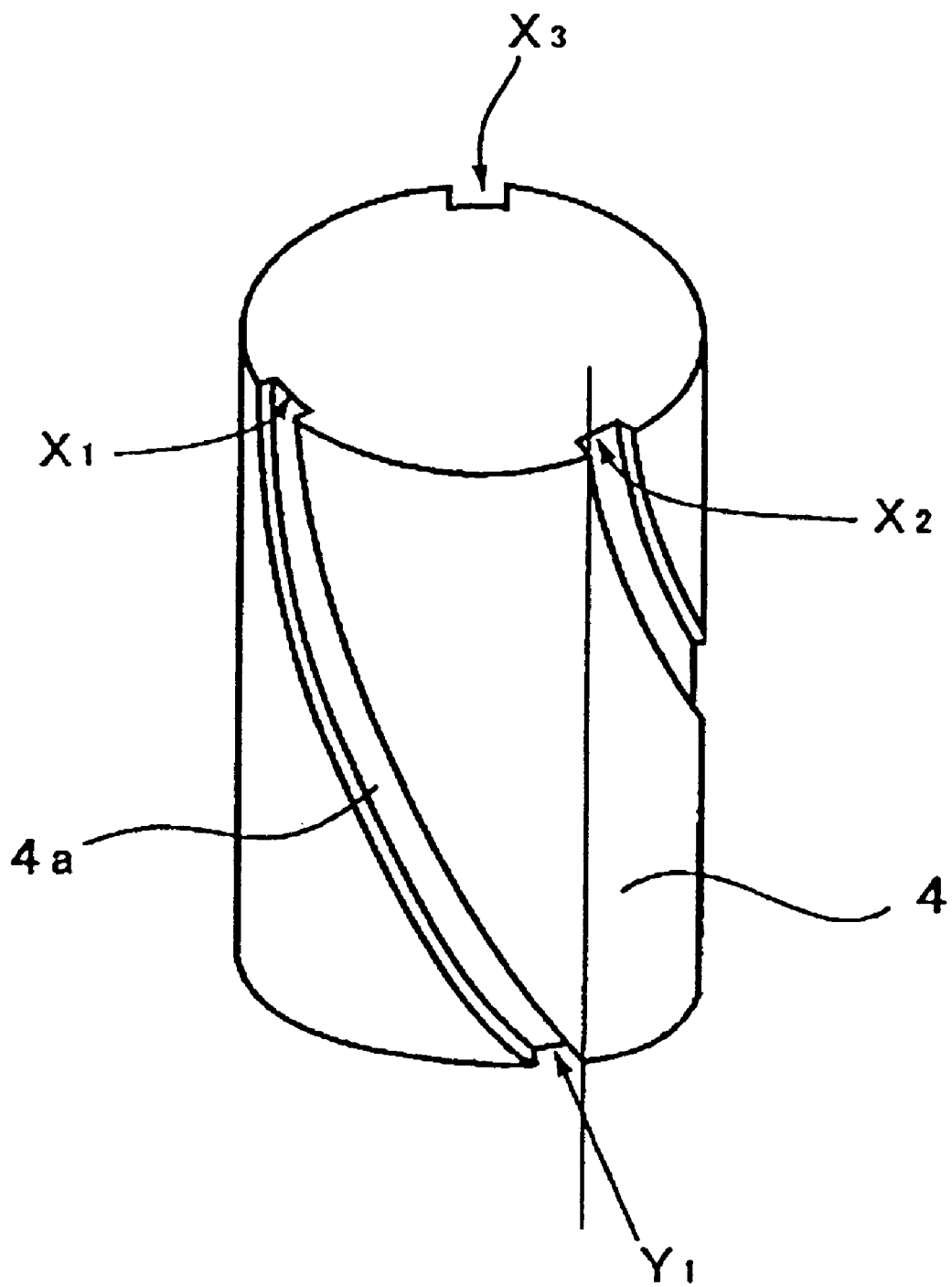
FIG. 7 is an outline view of radial hydrodynamic grooves of the present invention.

In any of the first to fourth embodiments, the radial hydrodynamic grooves formed in the outer periphery of the cylinder 4 may be herringbone grooves asymmetrical about the upper and lower parts as shown in FIGS. 5 and 6. Additionally, grooves as shown in FIG. 7 is formed, i.e., at least three groove lines 4a are formed in the circumferential surface. And, it is preferable to form the terminal Y1 of the groove line 4a in a range so as not to extend beyond the adjacent starting point X2 of the groove line 4a in a developed state. Additionally, from the starting point X1 to the terminal Y1, the groove line 4a may be a straight line or a spiral curve. The groove line 4a is normally 1 to 3 mm in width, and it may be a shallow groove of about several micrometers to several tens of micrometers in depth, and, according to how a whetstone is applied, the hollow cylinder may be formed to have a shaved flat surface. In the aforementioned groove line 4a, the number of processing steps can be reduced more significantly than with the herringbone groove, and an equal effect is achieved.

In any of the first to fourth embodiments, it is preferable to make at least the disk 3, the cylinder 4, and the hollow cylinder 6 by ceramic-made members, such as alumina, silicon nitride, and silicon carbide. Among these materials, alumina is the most cost-effective.

Figure 8:
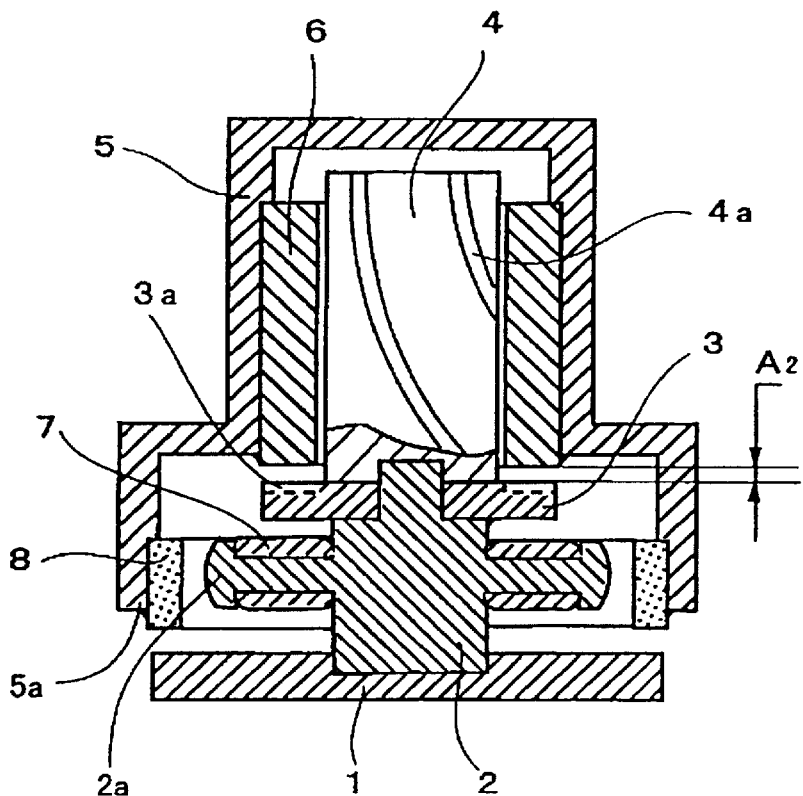
FIG. 8 is a sectional view of a spindle motor of a first comparative example.

Next, a description will be provided of the results of preparing and comparing comparative examples 1 and 2 in order to confirm the operational effect of embodiments 1 and 3. FIG. 8 shows the structure during steady-state rotation of a spindle motor of comparative example 1 compared with embodiment 1. The names, signs, and operations of constituent elements in FIG. 8 are exactly the same as in embodiment 1, and therefore their description is omitted. However, there is a difference in that, when the motor is stopped, the upper surface of the disk 3 and the bottom surface of the hollow cylinder 6, which constitute a thrust hydrodynamic gas bearing, are brought into contact together.

Figure 9:
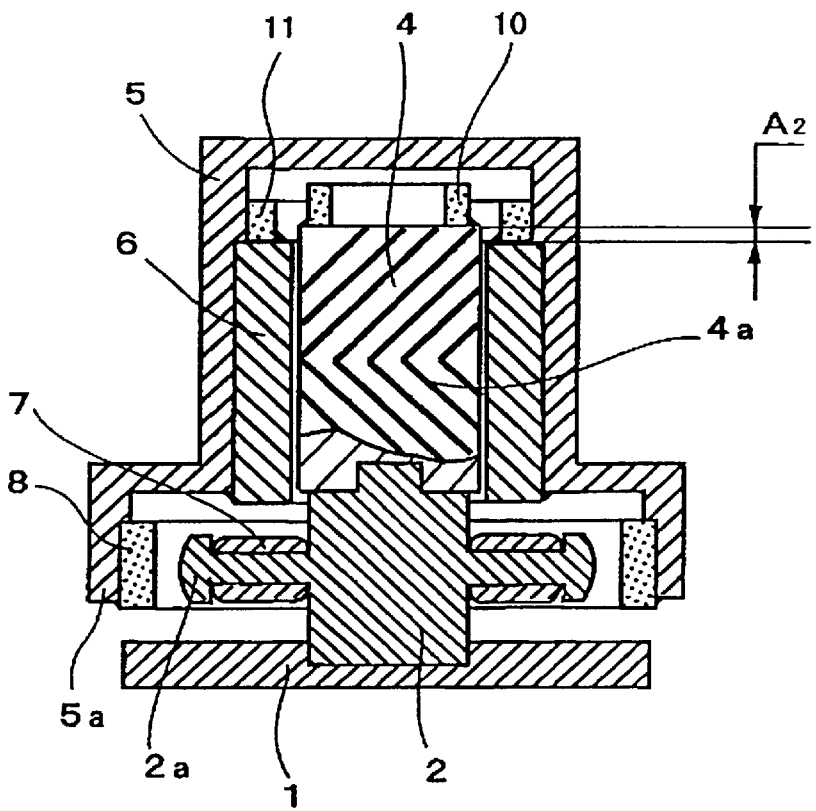
FIG. 9 is a sectional view of a spindle motor of a second comparative example.
Figure 10:
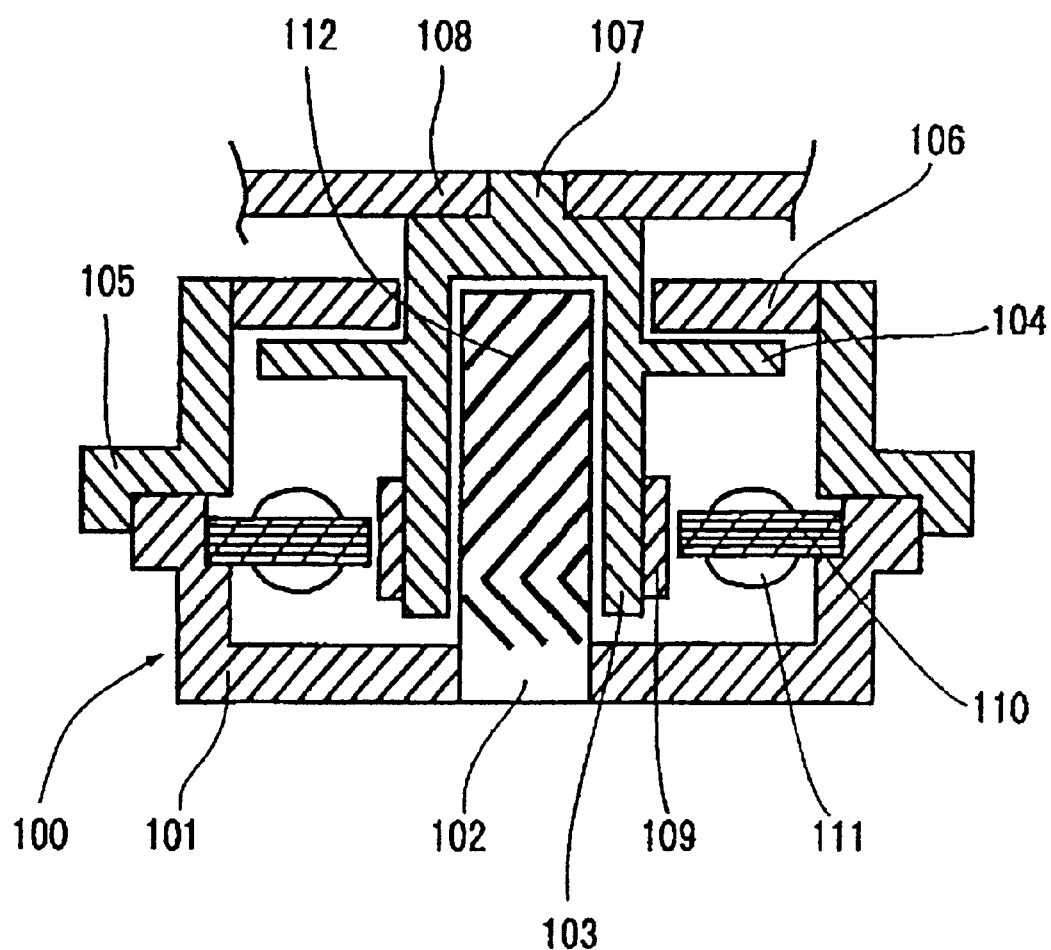
FIG. 10 is a sectional view of a conventional spindle motor.

FIG. 9 shows the structure during steady-state rotation of a spindle motor of comparative example 2 compared with embodiment 3. The names, signs, and operations of constituent elements in FIG. 9 are exactly the same as in embodiment 3, and therefore their description is omitted. However, the groove line 4a formed in the outer periphery of the cylinder 4 may be a herringbone groove that is even about the upper and lower parts or may be a longitudinal groove that is parallel to an axial center and straight. And, there is a difference in that the disk 3 that constitutes a thrust hydrodynamic gas bearing is omitted, and a thrust load is supported only by the primary and secondary magnetic bearings.

Table 1 shows results obtained such that the thrust load of embodiments 1, 3 and comparative examples 1, 2 is set constantly at 150 g, the spindle motor, the specification of which is a dc 12V rating, is driven at a steady-state revolving speed of 18000 rpm, and the up-and-down motion of the upper surface of the hub 5 is observed with a laser displacement gauge.

TABLE 1

| Sample | Current value at start | Up-and-down motion of hub during steady-state rotation |
|---|---|---|
| embodiment 1 | 1.2 A | 1 μm or less |
| embodiment 3 | 1.2 A | 1 μm or less |
| comparative ex. 1 | 2.8 A | 1 μm or less |
| comparative ex. 2 | 1.2 A | max 30 μm |

The results in Table 1 show that the up-and-down motion of the hub 5 during steady-state rotation is 1 μm or less in embodiments 1, 3, and comparative example 1, and the magnetic head of a reader is in a range in which it can follow the surface of the rotator of the magnetic disk. Therefore, the rotator never collide with the magnetic head. However, in comparative example 2, a thrust hydrodynamic gas bearing is omitted, and a thrust load is supported only by a magnetic bearing, and therefore the hub 5 floats unstably, which is unpractical.

In comparative example 1, as a current for starting, approximately 2.3 times that of embodiments 1 and 3 and comparative example 2 is required for generating rotation torque conquering the initial sliding resistance since the upper surface of the disk 3 and the lower end surface of the hollow cylinder 6 contact together in the stop condition. Concerning embodiment 1, since the best zone of magnetic lines of force of the rotor magnet 8 deviates slightly from the center of the motor coil 7 during steady-state rotation, the motor efficiency decreases, and a current value has a slight tendency to increase, but it is in a practically negligible range.

INDUSTRIAL APPLICABILITY

When the motor is stopped, the thrust load of a hub is supported by a primary magnetic bearing made up of a stator and a rotor magnet or in combination with a cylinder and a secondary magnetic bearing made up of a pair of ring-shaped permanent magnets disposed on the end face of a hollow cylinder, and the disk of the thrust hydrodynamic gas bearing and the end face of the hollow cylinder are maintained in a non-contact state. When the rotor magnet is activated, a force reducing the clearance of the thrust hydrodynamic gas bearing is generated by the radial hydrodynamic grooves of the radial hydrodynamic gas bearing so that the disk of the thrust hydrodynamic gas bearing and the hollow cylinder approach each other, and, during steady-state rotation, since the thrust load is supported chiefly by the repulsion of the thrust hydrodynamic gas bearing, it is possible to provide a spindle motor in which the constituent elements of the thrust hydrodynamic gas bearing are consistently prevented from coming in to contact together, and there is no need for concern over the wear of the elements. Also less electric power consumption is used at the start time. And, as is clear from FIGS. 1 to 4, since it has a structure that facilitates the centering of the interrelated members, it is also easy to maintain the gap of the thrust hydrodynamic gas bearing to have a value of several micrometers.

What is claimed is:

1. A spindle motor characterized in that it comprises: a cylinder of a radial hydrodynamic gas bearing having radial hydrodynamic grooves formed in an outer circumferential surface thereof; a disk of a thrust hydrodynamic gas bearing having thrust hydrodynamic grooves formed in an upper face thereof, the cylinder and the disk being disposed on and supported by an upper end of a stator core on an axial center of the stator core, the stator cow having a stator around which a motor coil is wound; a hollow cylinder whose inner surface facing the cylinder of the radial hydrodynamic gas bearing is smooth; and a rotor magnet facing the motor coil, the hollow cylinder and the rotor magnet being disposed on a hub acting as a rotational member; wherein a load in a radial direction is supported by the radial hydrodynamic gas bearing, and a load in a thrust direction is supported by using the thrust hydrodynamic gas bearing together with a magnetic bearing consisting of the stator and the rotor magnet.

2. A spindle motor according to claim 1, wherein the radial hydrodynamic grooves in the outer periphery of the cylinder consist of at least three groove lines each of the grooves extending along at least substantially all of an entire length of the cylinder, and, in a development, a terminal of a lead of the groove line is formed in a range so as not to extend beyond a starting point of an adjacent groove line.

3. A spindle motor according to claim 1, wherein the radial hydrodynamic grooves in the outer periphery of the cylinder are herringbone grooves comprising a first leg longer than a second leg thereof so as to form a groove length asymmetrical with respect to the upper and lower pans of the cylinder.

4. A spindle motor according to claim 1, wherein, when stopped, a thrust load of the hub is supported by the magnetic bearing, and the disk of the thrust hydrodynamic gas bearing and an end face of the hollow cylinder are maintained in a non-contact state, and, as the rotor magnet rotates, a force reducing the clearance of the thrust hydrodynamic gas bearing works by the radial hydrodynamic grooves of the radial hydrodynamic gas bearing, so that the disk of the thrust hydrodynamic gas bearing and the hollow cylinder approach each other, and, during steady-state rotation, a thrust load is supported chiefly by repulsion of the thrust hydrodynamic gas bearing.

5. A spindle motor according to claim 1, wherein ceramics are used for a member that constitutes the radial hydrodynamic gas bearing and the thrust hydrodynamic gas bearing.

6. A spindle motor characterized in that it comprises: a hub acting as a rotational member disposed on an upper end of a motor shaft provided with a rotor magnet on an outer periphery thereof, a disk of a thrust hydrodynamic gas bearing having thrust hydrodynamic grooves formed in a lower face thereof, a cylinder of a radial hydrodynamic gas bearing having radial hydrodynamic grooves formed in an outer circumferential surface thereof, the disk and the cylinder being disposed directly below and adjacent the motor shaft, a hollow cylinder having a smooth inner surface positioned to face the cylinder of the radial hydrodynamic gas bearing and having a top surface positioned to face the disk thrust hydrodynamic grooves, and a stator around which the motor coil is wound, the stator facing the rotor magnet, the hollow cylinder and the stator being disposed in a case as a fixed member, wherein a load in a radial direction is supported by the radial hydrodynamic gas bearing, and a load in a thrust direction is supported by using the thrust hydrodynamic gas bearing together with a magnetic bearing consisting of the stator and the rotor magnet.

7. A spindle motor comprising, in combination:

a cylinder of a radial hydrodynamic gas bearing having radial hydrodynamic grooves formed in an outer circumferential surface thereof;

a disk of a thrust hydrodynamic gas bearing having thrust hydrodynamic grooves formed in an upper face thereat the cylinder and the disk being disposed on an upper end on an axial center of a stator core having a stator around which a motor coil is wound;

a hollow cylinder having a smooth inner surface positioned on an inner surface of a hub acting as a rotational member to face the cylinder of the radial hydrodynamic gas bearing; and a rotor magnet disposed on said hub to face the stator motor coil, wherein a load in a radial direction is supported by the radial hydrodynamic gas bearing, wherein a load in a thrust direction is supported by using the thrust hydrodynamic gas bearing together with a magnetic bearing consisting of the stator and the rotor magnet, and wherein said rotor magnet and said motor coil are configured, in combination, to magnetically balance a weight of at least said hub and said hollow cylinder and said rotor magnet attached thereto so as to maintain a first clearance between said disk thrust hydrodynamic grooves and a bottom surface of said hollow cylinder in a static state and to maintain a second clearance between said disk thrust hydrodynamic grooves and said bottom surface of said hollow cylinder in a dynamic steady-state condition.

8. A spindle motor according to claim 7, wherein said first clearance between said disk thrust hydrodynamic grooves and said bottom surface of said hollow cylinder is larger than said second clearance between said disk thrust hydrodynamic grooves and said bottom surface of said hollow cylinder.

9. A spindle motor comprising, in combination:

a hub acting as a rotational member disposed on an upper end of a motor shaft provided with a rotor magnet disposed about an outer circumferential surface thereof;

a disk of a trust hydrodynamic gas bearing having thrust hydrodynamic grooves formed in a lower face thereof, a cylinder of a radial hydrodynamic gas bearing having radial hydrodynamic grooves formed in an outer circumferential surface thereof, the disk and the cylinder being disposed below the motor shaft in a fixed relation thereto, a hollow cylinder having a smooth inner surface positioned to face the cylinder of the radial hydrodynamic gas bearing and positioned so that a top surface of the hollow cylinder faces the disk thrust hydrodynamic grooves, and a stator around which the motor coil is wound, the stator facing the rotor magnet, the hollow cylinder and the stator being disposed in a case as a fixed member, wherein a load in a radial direction is supported by the radial hydrodynamic gas bearing, and wherein a load in a thrust direction is supported by using the thrust hydrodynamic gas bearing together with a magnetic bearing consisting of the stator and the rotor magnet, wherein said rotor magnet and said motor coil are configured, in combination, to magnetically balance a weight of at least said hub and said motor shaft, said disk, and said cylinder attached thereto so as to maintain a first clearance between said disk thrust hydrodynamic grooves and a top surface of said hollow cylinder in a static state and to maintain a second clearance between said disk thrust hydrodynamic grooves and said top surface of said hollow cylinder in a dynamic steady-state condition.

10. A spindle motor according to claim 9, wherein said first clearance between said disk thrust hydrodynamic grooves and said top surface of said hollow cylinder is larger than said second clearance between said disk thrust hydrodynamic grooves and said top surface of said hollow cylinder.

* * * * *